(12) United States Patent
Madden et al.

(10) Patent No.: US 11,922,784 B2
(45) Date of Patent: Mar. 5, 2024

(54) TAMPER DETECTION USING SMART SECURITY FASTENERS

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 39 days.

(21) Appl. No.: 17/316,107

(22) Filed: May 10, 2021

(65) Prior Publication Data

US 2021/0350680 A1 Nov. 11, 2021

Related U.S. Application Data

(60) Provisional application No. 63/021,995, filed on May 8, 2020.

(51) Int. Cl.
*G08B 13/06* (2006.01)
*F16B 41/00* (2006.01)
*H04N 23/54* (2023.01)

(52) U.S. Cl.
CPC ............ *G08B 13/06* (2013.01); *F16B 41/005* (2013.01); *H04N 23/54* (2023.01)

(58) Field of Classification Search
CPC .............. G08B 13/06; G06K 19/07758; G06F 16/2379
See application file for complete search history.

(56) References Cited

U.S. PATENT DOCUMENTS

| | | | | |
|---|---|---|---|---|
| 6,791,465 B2* | 9/2004 | Blagin | .................. | F16B 41/005 73/761 |
| 6,843,628 B1* | 1/2005 | Hoffmeister | ..... | G06K 19/06009 411/378 |
| 7,474,223 B2* | 1/2009 | Nycz | ..................... | G16H 10/65 340/539.12 |
| 7,479,877 B2* | 1/2009 | Mortenson | ............. | G08B 21/02 340/541 |
| 7,564,350 B2* | 7/2009 | Boman | .................... | H04Q 9/00 340/541 |
| 7,828,346 B2* | 11/2010 | Terry | .................... | G09F 3/0358 292/307 R |

(Continued)

*Primary Examiner* — Hoi C Lau
(74) *Attorney, Agent, or Firm* — Fish & Richardson P.C.

(57) ABSTRACT

Methods, systems, and apparatus, including computer programs encoded on a computer storage medium, are described for implementing a smart security fastener. The smart security fastener includes a body configured to be installed at a property; and a head that is supported by the body. The head has circuitry that includes: a micro-processor that generates control signals; and a radio device that is coupled to the micro-processor. The radio device is operable to: i) transmit data to a property monitoring system based on the control signals, where the data indicates an installation status of the smart security fastener; and ii) receive a command from the property monitoring system that indicates authorization to uninstall the smart security fastener. The circuitry also includes a power source that powers each of the micro-processor and the radio device.

19 Claims, 5 Drawing Sheets

(56) References Cited

U.S. PATENT DOCUMENTS

| | | | | |
|---|---|---|---|---|
| 8,521,448 B1* | 8/2013 | Ung | | F16B 1/0071 |
| | | | | 702/42 |
| 8,584,957 B2* | 11/2013 | Zhu | | F16B 31/02 |
| | | | | 73/761 |
| 10,635,963 B2* | 4/2020 | Grove | | G06K 19/07773 |
| 10,788,384 B1* | 9/2020 | Chen | | G01L 1/14 |
| 10,941,802 B2* | 3/2021 | Zhu | | G06K 19/07758 |
| 11,074,490 B2* | 7/2021 | Aske | | G06K 19/07758 |
| 11,080,584 B2* | 8/2021 | Grove | | G06K 19/07758 |
| 11,255,371 B2* | 2/2022 | Dubberly | | F16B 43/005 |
| 11,586,872 B2* | 2/2023 | Grove | | G06K 19/07773 |
| 2002/0044063 A1* | 4/2002 | Blagin | | F16B 41/005 |
| | | | | 73/761 |
| 2004/0161317 A1* | 8/2004 | Jones | | F16B 5/0208 |
| | | | | 411/433 |
| 2004/0190591 A1* | 9/2004 | Zhang | | G01K 3/005 |
| | | | | 374/162 |
| 2008/0047353 A1* | 2/2008 | Clark | | F16B 31/025 |
| | | | | 73/761 |
| 2008/0178713 A1* | 7/2008 | Long | | B25B 23/14 |
| | | | | 73/862.21 |
| 2008/0315596 A1* | 12/2008 | Terry | | G09F 3/0317 |
| | | | | 709/250 |
| 2008/0319570 A1* | 12/2008 | Van Schoiack | | B25B 21/00 |
| | | | | 700/110 |
| 2009/0026773 A1* | 1/2009 | Terry | | G09F 3/0329 |
| | | | | 292/327 |
| 2010/0050778 A1* | 3/2010 | Herley | | F16B 31/02 |
| | | | | 73/761 |
| 2013/0186951 A1* | 7/2013 | Zhu | | F16B 31/02 |
| | | | | 235/375 |
| 2017/0016469 A1* | 1/2017 | Zhu | | G06K 19/0775 |
| 2018/0169844 A1* | 6/2018 | Nemecek | | G09F 3/0297 |
| 2019/0093700 A1* | 3/2019 | Dubberly | | F16B 37/048 |
| 2019/0244071 A1* | 8/2019 | Grove | | G06K 19/07773 |
| 2020/0293850 A1* | 9/2020 | Grove | | G06K 19/07794 |
| 2021/0125022 A1* | 4/2021 | Aske | | C09J 163/00 |
| 2021/0350680 A1* | 11/2021 | Madden | | G08B 13/06 |
| 2021/0357721 A1* | 11/2021 | Grove | | G06K 19/07771 |
| 2022/0220998 A1* | 7/2022 | Dubberly | | F16B 37/048 |
| 2022/0230041 A1* | 7/2022 | Prendergast | | H01Q 1/2225 |

* cited by examiner

```
                                    400

┌─────────────────────────────────────────────────────────────────┐
    │  INITIATE A CONNECTION MODE OF A SMART FASTENER BASED ON A     │
    │  NORMALLY-CLOSED SWITCH INTEGRATED AT THE SMART FASTENER        │
    │                                                            410  │
    └─────────────────────────────────────────────────────────────────┘
                                    │
                                    ▼
    ┌─────────────────────────────────────────────────────────────────┐
    │  BASED ON THE CONNECTION MODE, ESTABLISH A FIRST CONNECTION    │
    │  BETWEEN THE SMART FASTENER AND AN ITEM AT A PROPERTY           │
    │                                                            420  │
    └─────────────────────────────────────────────────────────────────┘
                                    │
                                    ▼
    ┌─────────────────────────────────────────────────────────────────┐
    │  PROVIDE AN AUTHORIZATION COMMAND IN RESPONSE TO ESTABLISHING   │
    │  THE FIRST CONNECTION                                           │
    │                                                            430  │
    └─────────────────────────────────────────────────────────────────┘
                                    │
                                    ▼
    ┌─────────────────────────────────────────────────────────────────┐
    │  USING THE ITEM AT THE PROPERTY, INSTALL OR UNINSTALL THE SMART │
    │  FASTENER AT THE SECURITY PANEL BASED ON THE AUTHORIZATION      │
    │  COMMAND                                                        │
    │                                                            440  │
    └─────────────────────────────────────────────────────────────────┘
```

Fig. 4

TAMPER DETECTION USING SMART SECURITY FASTENERS

CROSS REFERENCE TO RELATED APPLICATION

This application claims the benefit of U.S. Provisional Application No. 63/021,995, filed on May 8, 2020, which is incorporated herein by reference in its entirety.

FIELD

This specification relates to fasteners for securing objects.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The functionality afforded by these sensors and devices can be leveraged to secure items at a property, to obtain information about respective items at multiple different properties, and to control certain safety devices that may be located at the properties. Sensors and devices at a property may include one or more fasteners. In some cases, one or more sensors or devices at the property may be secured by a panel and the panel can include various types of fasteners that restrict access to the sensors. The fasteners may also secure the panel to a compartment or area of the property that includes the sensors.

SUMMARY

This document describes techniques for implementing smart security fasteners. As noted above, the smart fasteners may be included at different sensors or devices at a property. The smart fasteners may be used to assemble or secure an object in a public or shared space, where the object might be tampered with. Examples of objects that can be fastened or secured using the described smart fasteners include switch plates, door hardware, camera mountings, signage, or access hatches. The smart security fasteners can represent "security screws" or bolts that are used in these applications. The smart fasteners may be configured to include special keyed heads that make it difficult to loosen the fastener or the object without a particular tool.

In some cases, a device such as sensor may be positioned in an area of a property secured by a panel that includes smart fasteners. The smart fasteners are installed at the panel to secure the panel to the area of the property. In other cases, a smart security fastener may attach a camera mount to a wall. In yet another example, a smart security fastener may keep an access hatch shut. Each of the smart fasteners include a battery-powered transmitter for transmitting a signal to an alarm/control panel of a property monitoring system or directly to a monitoring server of the property monitoring system.

The smart security fastener includes a switch that is used to detect whether the smart fastener is installed, or uninstalled at the property. The switch causes the transmitter to transmit signals to the control panel to indicate whether the fastener is installed or uninstalled. In some implementations, the panel or device where the fastener is installed (or uninstalled) is adapted to communicate with the control panel or monitoring server of the property monitoring system. For example, when a person unscrews a smart security fastener that attaches a camera to a wall, the smart security fastener may, in response, transmit an alert to a monitoring server that indicates that the camera is being tampered with.

One aspect of the subject matter described in this specification can be embodied in a smart security fastener. The smart security fastener includes a body configured to be installed at a property; and a head that is supported by the body. The head has circuitry that includes: a micro-processor that generates control signals; and a radio device that is coupled to the micro-processor. The radio device is operable to: i) transmit data to a property monitoring system based on the control signals, where the data indicates an installation status of the smart security fastener; and ii) receive a command from the property monitoring system that indicates authorization to uninstall the smart security fastener. The circuitry also includes a power source that powers each of the micro-processor and the radio device.

These and other implementations can each optionally include one or more of the following features. For example, in some implementations, the smart security fastener includes a switch integrated at an exterior wall of the head that faces the body. The switch is configured to: i) protrude from the exterior wall of the head; ii) be depressed when the smart security fastener is installed at the panel; and iii) cause the radio device transmit the data indicating the installation status of the smart security fastener.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

FIG. 4 shows an example process that involves communication between a smart fastener at a panel and a tool that interacts with the smart fastener.

Like reference numbers and designations in the various drawings indicate like elements.

DETAILED DESCRIPTION

A property, such as a house or a place of business, can be equipped with a property monitoring system to enhance the security of the property. The property monitoring system may include one or more sensors, such as motion sensors, camera/digital image sensors, temperature sensors, distributed about the property to monitor conditions at the property. In many cases, the monitoring system also includes a control unit and one or more controls which enable automation of various actions at the property. The actions can include receiving status signals from devices or components of the property are used to restrict access to certain areas at the property. The actions can also include triggering commands to arm or disarm a security system at the property based on the status signals.

In this context, techniques are described for implementing smart security fasteners and a computing system that receives signals generated by the smart fasteners and that provides commands to the smart fasteners (or to a tool for installing the fasteners) indicating authorization to install or uninstall the smart fasteners located at the property. For example, each smart fastener includes a respective microprocessor that is configured to generate an installation signal based on time-based capacitance triggered by depression of a switch integrated at the smart fastener. The installation signal is received and processed by a monitoring server of the property monitoring system to detect or confirm when each smart fastener is installed to fasten or secure an object at the property.

The smart fastener also includes a radio component/device that is configured to communicate, e.g., wirelessly with other sensors, "smart" devices, of the property monitoring system, including the monitoring server. In some implementations, the microprocessor and radio device as well as other components (or devices) of the computing system are included in a head of the smart fastener. The components of the smart fastener can interact to transmit a parameter signal to the monitoring server when the smart fastener is in a pre-installation mode. The smart fastener may be one of multiple components included in a property monitoring system for securing items at the property and improving the safety of the occupants at the property.

Figure 1:
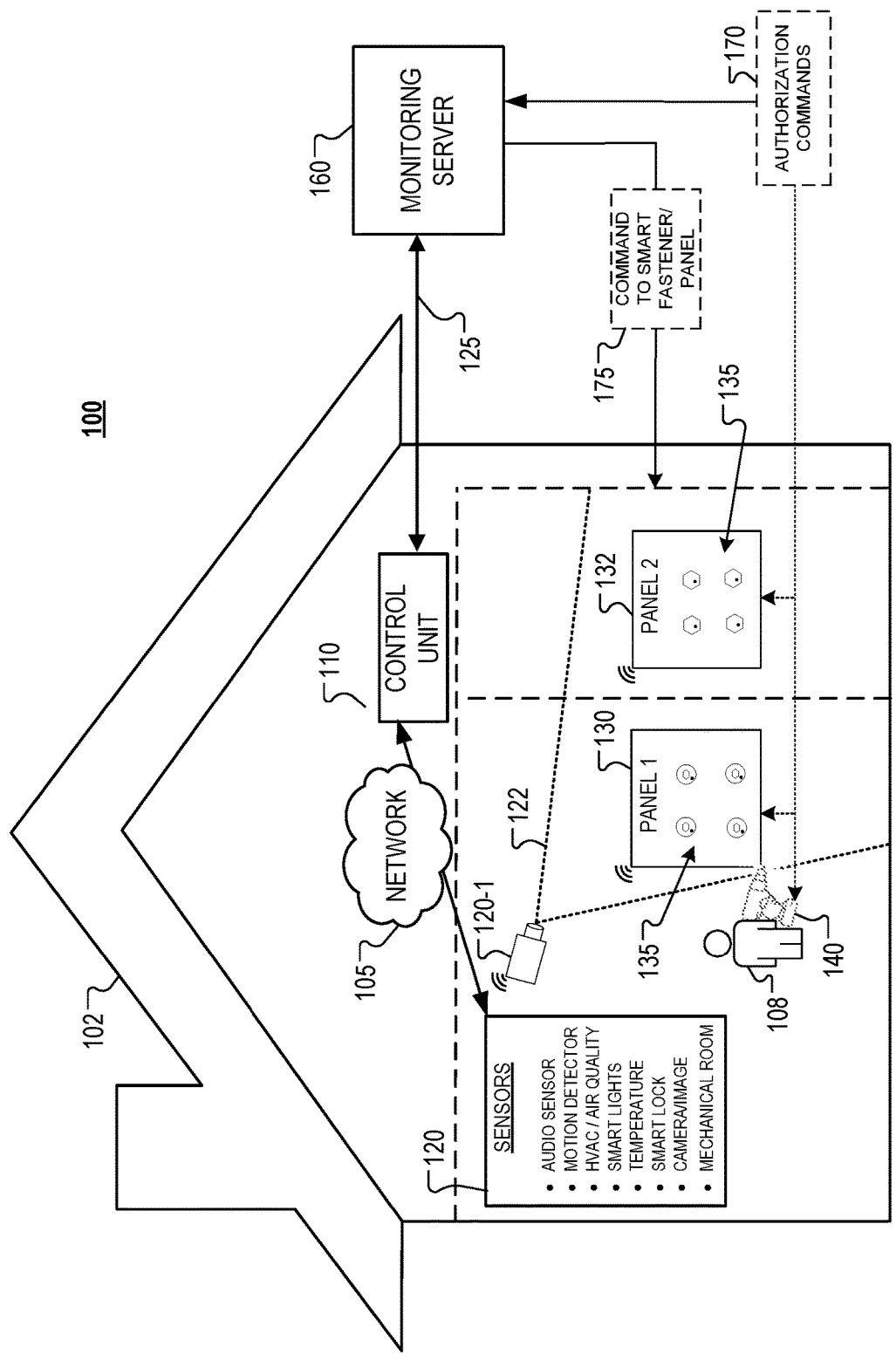
FIG. 1 is a block diagram of an example property monitoring system and shows examples of smart fasteners for installation in a panel at a property.

FIG. 1 shows a block diagram of an example property monitoring system 100 ("system 100") that can be used to perform one or more actions for securing a property 102 and for improving the safety of one or more occupants at the property 102. The property 102 may be, for example, a residence, such as a single family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. For example, a sensor can be associated with a video or image recording device located at the property 102, such as a digital camera or other electronic recording device. Similarly, a sensor(s) can be associated with smart fasteners and associated mechanisms used to determine or indicate whether panels or objects have been secured at the property using the smart fasteners as well as to present status indications (described below) to occupants at the property 102.

As described above, the property 102 is monitored by a property monitoring system. The property monitoring system includes a control unit 110 that sends sensor data 125, obtained using sensors 120, to a remote monitoring server 160. The system 100 also includes a smart fastener 135 that is operable to generate sensor data 125 that can be processed at the monitoring server 160 to detect whether an emergency incident is occurring at the property 102. In some implementations, control units, monitoring servers, or other computing modules described herein are included as sub-systems of the property monitoring system 100.

Each of the smart fastener 135 and monitoring server 160 is operable to detect or determine an installation status of the smart fastener 135, as well as an occurrence of uninstallation of the smart fastener 135 at a property. In some cases, the monitoring server 160 determines that an emergency incident is occurring at the property 102 based on data communications with at least one of the smart fasteners 135 that indicates uninstallation of the smart fastener 135. In other cases, the monitoring server 160 determines that an emergency incident is occurring at the property 102 based on data communications with the smart fasteners 135 and communications with multiple sensors 120 that are installed at the property 102.

Control unit 110 can be located at the property 102 and may be a computer system or other electronic device configured to communicate with the sensors 120 and the smart fastener 135 to cause various functions to be performed for the property monitoring system 100. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded or dedicated hardware. The control unit 110 may also include software, which configures the unit to perform the functions described in this document.

For example, the control unit 110 can activate a camera, lock or unlock a door/window, activate/arm an alarm system, de-activate/de-arm the alarm system, power on or off a light at the property 102, or communicate with one or more of the smart fasteners 135. In some implementations, the camera or recording device can be a particular type of sensor 120 or may be a combination of different types of sensors 120. A video recorder 120-1 can be configured to obtain video or image data of various rooms and sections of property 102. For example, the video recorder can be a camera (e.g., a digital camera) that captures video or still images within a viewable area 122 of the property 102.

The monitoring server 160 can be configured to perform various functions for analyzing and monitoring conditions of items and persons in a viewable area 122 at the property 102. For example, the monitoring server 160 can perform these functions based on the video data and other sensor data 125 encoded in wired or wireless signal transmissions received by the monitoring server 160.

In some implementations, the monitoring server 160 can map one or more video cameras 120-1 to various locations of smart fasteners 135 based on the video or image data obtained for a viewable area 122. Based on the mapping of the video cameras 120-1 to the fastener locations, the monitoring server 160 is operable to: i) perform visual recognition of a type or style of the smart fasteners 135; ii) perform visual recognition of an individual such as a maintenance person; iii) perform identity verification of maintenance personnel; and iv) generate video logs of maintenance performed on the smart fasteners 135.

In some cases, the monitoring server 160 can verify the identity of the maintenance person in response to visually analyzing physical/biometric features of the person, using various facial recognition techniques, or both. In some implementations, each of the smart fasteners 135 and the monitoring server 160 are configured to track the maintenance between different locations of the smart fasteners 135 based on video and image data obtained using the camera 120-1. The smart fasteners 135 and the monitoring server 160 can be configured to trigger alarm recording to detect tampering with the fastener based on the video/image data.

Each individual smart fastener 135 can be configured to provide indications of suspected, or confirmed, tampering and to have features that are resistant to tampering. In some implementations, assuming the availability of ultra-low-power or ultra-small sensors, each of the smart fasteners 135 can be designed to integrate an ultra-small or miniaturized imaging device/sensor. The device can be used to detect when a person is within close proximity to a smart fastener 135 that is installed and armed, as well as to capture an image or video of the suspected tamperer.

Each of the smart fasteners 135 can include a staining material or substance that interacts with a person that attempts unauthorized uninstallation of the smart fasteners 135. For example, a miniature dye-pack can be attached to a smart fastener 135 and designed to rupture and release dye in response to detected tampering of the smart fasteners 135, including attempts at unauthorized uninstallation of the smart fasteners 135. The dye-pack can rupture and stain the hands of an individual attempting to tamper with the fasteners. Additionally, or alternatively, the dye-pack can rupture and leave a stain on the fastener 135 (e.g., rather than the tamperer) and/or a panel that is secured by the fasteners. This staining of the smart fastener 135 would make it obvious that the fastener had been tampered with or make the fastener easier to find for a user or investigator that may eventually investigate suspected tampering or unauthorized uninstallation. Additional mechanisms that cause the smart fasteners 135 to be resistant to tampering are described in more detail below with reference to FIG. 2.

As described in more detail below, a user 108 can use mobile/client device (not shown) to interact with a smart home/property application and provide commands to the smart fasteners 135 or sensors 120, via the control unit 110, to perform the various operations described in this document.

In some implementations, the user 108 communicates with the control unit 110 through a network connection, such as a wired or wireless connection. The user 108 can be a property owner, security manager, property manager, or occupant/resident of the property 102. In some implementations, the property owner or user 108 communicates with the control unit 110 through a software application (e.g., "smart home" or "smart business" application) installed on their mobile device. The control unit 110 can perform various operations related to the property 102 by sending commands to one or more of the sensors 120 at the property 102.

The user 108 can also use a smart tool 140 to install or uninstall each of the smart fasteners 135 at a security panel, such as panels 130, 132 at the property 102. Each of panel 130 or panel 132 is referred to alternatively as security panel 130 or security panel 132, respectively. References to panel 130, 132, can indicate a reference to panel 130, panel 132, or both. In some implementations, panel 130 can be an example panel (e.g., a hatch) at a property 102, such as a panel or hatch that conceals circuit breakers for the electrical wiring at the property 102. Although depicted as being at a property 102 in the example of FIG. 1, in some implementations, panels 130, 132 can be a panel of a device or item, such as a vehicle or other item of transportation.

As indicated above, while panels are referenced as examples, the smart fasteners 135 may be used or installed at a variety of objects, such as different sensors or devices located at a property or other shared/public space. For example, the smart fasteners may be used to assemble or secure an object in a public or shared space, where the object might be susceptible to being tampered with. Examples of objects that can be fastened or secured using the smart fasteners 135 include switch plates, door hardware, camera mountings, signage, or access hatches. In some implementations, the smart security fasteners represent "security screws" or "security bolts" used in these applications.

The smart tool 140 is operable to interface or communicate with the smart fastener 135. In general, the smart fasteners 135 are installed at panels 130, 132 to secure the panels or to restrict access to components and sensor devices that are behind, or concealed by, the panels 130, 132. For example, the smart fasteners 135 secures the panels 130, 132 to a compartment or area of the property 102 that can include the sensors 120 or various other devices. Each of the panels 130, 132, can be example security panels of the property monitoring system 100.

The smart tool 140 is operable to interface or communicate with the panels 130, 132, to receive instructions or commands from the panels 130, 132. The commands can be related to installation of the smart fasteners 135. In some implementations, each of the panels 130, 132 and monitoring server 160 are operable to provide authorization commands 170 (e.g., in real-time) to the smart tool 140 for indication to the user 108. The smart tool 140 can be passive device that communicates with other devices based on radio frequency identification technology (RFID).

The monitoring server 160 can generate an example authorization command 170 based on data provided by the smart fastener 135. The authorization command 170 can be a command to indicate that installation or uninstallation of the smart fastener 135 has been authorized by the property monitoring system. For example, the authorization commands 170 can indicate authorization to uninstall or install a particular type of smart fastener 135 at panel 130, panel 132, or both. The smart tool 140 and its various functions are described in more detail below with reference to the example of FIG. 4.

The sensors 120 can receive, via network 105, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from control unit 110 that communicates with monitoring server 160. In addition to detecting and processing wireless signals received via network 105, the sensors 120 can also transmit wireless signals that encode sensor data 125.

The monitoring server 160 receives and analyzes the sensor data 125 encoded in wireless signals transmitted by the sensors 120. For example, the monitoring server 160 analyzes the sensor data 125 encoded in the wireless signals to determine or to obtain information about activities occurring at the property, such as a location of an emergency incident or a location of occupants that may be affected by the incident. In some implementations, monitoring server 160 performs various functions related to analyzing or monitoring video and image data as well as processing sensor parameter values included in the sensor data 125.

As described below, the smart fastener 135 can include electronic and signal processing components for integrating or communicating with components of the property monitoring system 100. For example, the smart fastener 135 is operable to receive commands 175 and other signals for authorizing uninstallation of the smart fastener 135 for the securing, locking, or unlocking of the panel 130, 132 at the property 102. In some implementations, the command 175 is a data payload that includes instructions and data values for commanding the smart fastener 135 or components of the smart fastener 135 to perform one or more functions. For example, the command 175 causes the smart fastener 135 to display status indications via a light-emitting diode integrated at the smart fastener 135. In some implementations, the status indications are flashes of light, via a flashing LED, which indicates the smart fastener is ready to be installed (or uninstalled).

Each of the smart fastener 135 and the monitoring server 160 is configured to detect unauthorized uninstallation of the smart fastener in response to a switch of the smart fastener being closed (or opened), such as during uninstallation of the smart fastener, including a time period following uninstallation of the. In some implementations, the smart fastener 135 and/or the monitoring server 160 is operable to detect that a status signal reporting uninstallation of the smart fastener indicates unauthorized uninstallation. For example, the smart fastener 135 and/or the monitoring server 160 triggers this detection at least by determining whether an authorization command to install the smart fastener 135 was issued for the smart fastener prior to the detected uninstallation.

The smart fastener 135 is operable to independently detect that it has been uninstalled and transmit a status signal to the monitoring server based on the detected uninstallation of the smart fastener. The status signal indicates an installation status of the smart fastener. In some implementations, the smart fastener 135 is configured to detect that its uninstallation was either authorized or not authorized based on a sequence of install and/or uninstall flags, and their respective timestamps, that are stored in a memory of the smart fastener 135. In some other implementations, following uninstallation and powering on of the smart fastener 135, the fastener transmits a status/request signal and then detects receipt of a corresponding signal that represents an: i) authorized uninstall flag/command that indicates authorized uninstallation of the smart fastener or ii) unauthorized uninstall flag/command that indicates unauthorized uninstallation of the smart fastener.

Figure 2:
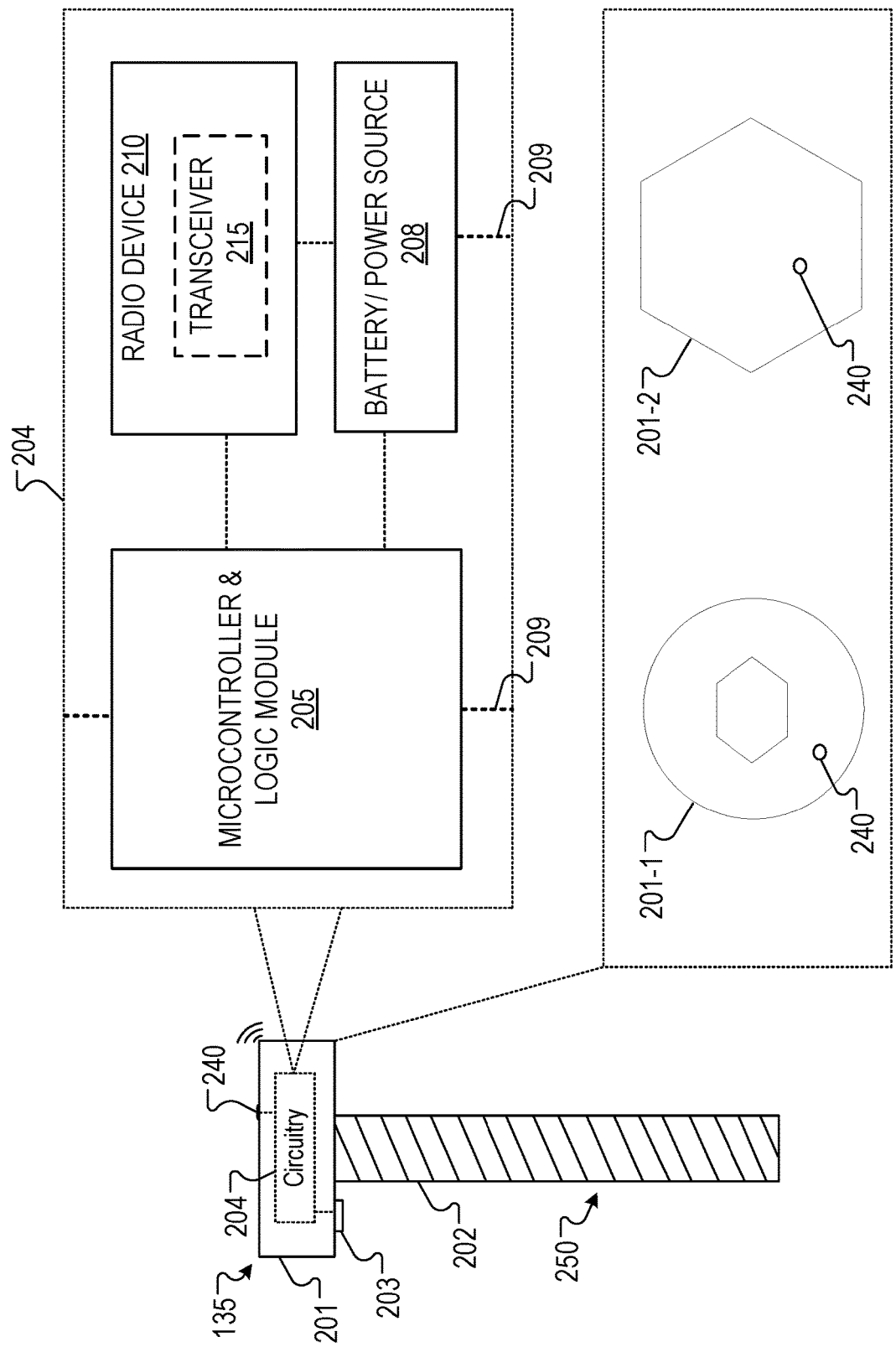
FIG. 2 illustrates an example smart fastener that can be installed to fasten items at a property.

FIG. 2 illustrates an example smart fastener 135 that can be installed to secure a panel 130, 132 or an example device at a property 102. As noted above, this document describes techniques for designing and implementing different types of smart security fasteners 135. As shown in the example of FIG. 2, each of the smart fasteners 135 include a head 201 and a body 202 (or shaft 202). The smart fasteners 135 can have any type of standard head 201, such as any known design or configuration for a screw, bolt, or general fastener. For example, one or more of the smart fasteners 135 can have a slotted screw head 201, a Phillips screw head 201, a hex screw head 201, or various other types of head configurations that can be used for designer fastener.

The head 201 can have different types or styles of heads, such as a rounded or circular head 201-1 and a hex head 201-2. In some implementations, the heads 201-1 and 201-2 represent special keyed heads that are configured such that installation or uninstallation of the smart fasteners 135 requires a particular or unique tool, or such that loosening or uninstallation of the smart fasteners 135 is difficult without a particular tool. The body 202 includes threads 250 that are used for screwing or bolting the panel securely to an item. For example, a portion of the body 202 can pass through a hole in the panel 130 and be received by an insert (e.g., a threaded insert) in the item to form a threaded connection with the item via the insert. In some cases, the smart fastener 135 can be implemented as a nut, a washer, a threaded inset, or other component of an example fastening system.

Each of the smart fasteners 135 also include a switch 203 and circuitry 204. The switch 203 may be a mechanical switch that is configured as a normally-closed mechanical switch. In some implementations, the switch 203 is a spring-loaded, normally-closed mechanical switch, where the spring force causes the switch to be normally-closed until a force that is applied to the switch 203 exceeds the spring force and causes the switch 203 to open. The switch 203 is integrated at an exterior wall of the head that faces the body 202. The switch 203 is configured or designed to protrude from the exterior wall of the head 201 and to be depressed when the smart security fastener 135 is installed at the panel 130, 132. The switch 203 can be angled, curved, or include a ball-bearing, such that friction between the switch 203 and a surface of an item being secured by the smart fastener 135 does not prevent the fastener from turning (in either direction) once the switch 203 makes contact with the surface.

A respective power source 208 in each of the smart fasteners 135 provides power (e.g., voltage and/or current) to the circuitry 204, including its components, and hardware modules located in the smart fastener 135. When the switch 203 is closed, the power source 208 routes power, e.g., using wired connections 209 to different components of the circuitry 204 to cause occurrence of different actions and operations related to installation or uninstallation of the corresponding smart fastener 135 that includes the switch 203 and the circuitry 204.

Installing a smart fastener 135 at the panels 130, 132 causes a radio device (described below) installed at the head 201 of the fastener 135 to transmit signals or data that indicate an installation status of the smart fastener 135 relative to the panel. More specifically, installing a smart fastener 135 in the panels 130, 132 causes the respective switch 203 to open. Each of the switch 203 and circuitry 204 is configured such that, when the switch 203 is being installed or is opened, the power source 208 causes a momentary capacitive charge to be stored and subsequently released.

The module 205 can detect that the switch 203 is opened and use the stored charge to cause the radio device 210 to send install status information, e.g., a status signal to a receiving device. The status signal indicates to the receiving device that the smart fastener 135 is properly installed at the panel. The receiving device can be the security panel that is receiving the smart fasteners 135, the monitoring server 160, or even a smart tool 140 that is being used to install the smart fasteners 135.

The circuitry 204 includes a hardware module 205 and a radio communication device 210 ("radio device 210"). The module 205 can be a hardware circuit, or section of a hardware circuit, that has a microcontroller and logic module that includes one or more of processors and memory. The memory can be a non-transitory machine-readable storage device storing instructions that correspond to programmed logic. The instructions are executable by the one or more of the processors to cause the smart fastener 135 to perform various types of actions and operations.

In some implementations, the circuitry 204 includes a microprocessor that corresponds to, or that is represented by, the microcontroller and logic module 205. In some examples, the microprocessor is integrated in the microcontroller and logic module 205 and executes the instructions stored in the memory. The respective microcontroller and logic module 205 in each of the smart fasteners 135 can interact with the monitoring server 160 to construct a permission structure that defines permissible conditions in which the smart fastener 135 can be installed or uninstalled.

The radio device 210 is an example sensing device that includes a transceiver 215. The transceiver 215 is operable to: i) transmit signals or data indicating a pairing/connection mode or installation status of the smart fastener 135 and ii) receive commands for controlling various functions of the module 205 or radio/sensing device 210. In some implementations, the radio device 210 is a wireless radio transceiver, such a as category-M (Cat-M) device that includes an LTE chipset for exchanging data and signal communications with components of the property monitoring system 100, including smart fasteners 135.

The transceiver 215 is operable to transmit parameter signals generated based on instructions and logic of the module 205 and to receive commands for controlling status indications that may be generated using an example light-emitting diode 240 ("LED 240") of the smart fastener 135. For example, the commands can be received by the radio device 210 and processed at the microprocessor of module 205 to control status indications of the LED 240 or to control signals transmitted by the radio device 210. A respective status indication of each LED 240 of the smart fasteners 135 is operable to convey an order of installation of the smart fastener 135 relative to another smart fastener 135. As noted above, the smart tool 140 is operable to interface or communicate with the smart fasteners 135. The LED 240 can indicate that the smart tool 140 is being used to install/uninstall a correct or incorrect fastener based at least on signal communications between the smart fasteners 135 and the tool 140. In this manner the LED 240 is operable to provide various indications to guide a user/installer during installation or uninstallation of the smart fasteners 135.

In some implementations, the radio device 210 can be a small battery-powered transmitter/receiver device which uses Bluetooth Low Energy (BTLE), Z-Wave, or other low-power protocols to send a signals for transmitting data communications (e.g., commands) to a receiving device. For example, the signals or communications can be sent to an alarm panel (e.g., control unit 110) associated with the property 102 when an individual attempts to uninstall the smart fastener 135.

Each of the smart fasteners 135 can be shipped in packaging that keeps the switch 203 depressed, and thus the battery or power source 208 disconnected and not providing power to the circuitry 204. Prior to installation of the smart fasteners 135 at the panels, an installer removes the packaging, which causes the spring-loaded switch 203 to be released to its normally-closed position, and causes the smart fastener 135 to initially activate (or turn on) based on the power signals that are routed to the circuitry 204 via the wired connections 209.

Each of the smart fasteners 135 can be configured to initially turn on in a pairing mode. The pairing mode of the smart fasteners 135 allows the installer to pair the smart fasteners 135 with an example alarm panel (e.g., panel 130) or security hub (e.g., control unit 110) at the property 102. For example, the installer can use a smart home application that is launched from a mobile device or smart tool 140 to facilitate pairing the smart fasteners 135 with the panels. In response to pairing the smart fasteners 135 with the panel, the installer can view descriptive information associated with installation or uninstallation of the smart fasteners 135, at the mobile device or smart tool 140. For example, the installer can receive an example torque setting for the smart fasteners 135 or an example timestamp that indicates a time of installation or uninstallation of the smart fasteners 135 at the panel. In some cases the installation timestamp may be stored at the panel, at the smart fastener 135, or at the monitoring server 160 as a maintenance record.

The installer installs or screws the smart fasteners 135 into position at the panels 130, 132. As noted above, installation of a smart fastener 135 depresses its corresponding switch 203 and turns off (e.g., powers down) the smart fastener 135. To allow the smart fastener 135 to confirm its installation status with at least the panel 130, 132 or the monitoring server 160, before shutting down, an installation status signal is transmitted by the radio device 210 using an intentional delay that is induced by a timer or capacitance of the circuitry 204. For example, the module 205 and power source 208 cooperate to cause a momentary capacitive charge to be stored and subsequently released to cause transmission of the status signal by the transceiver 215. In some implementations, the momentary capacitive charge is stored and subsequently released based on an RC circuit or the time constant of the RC circuit.

When the smart fastener 135 is unscrewed or uninstalled the switch 203 is released the fastener 135 powers back on and connects to the panel 130. The panels 130, 132 are operable to take appropriate action, in response to establishing a connection with smart fasteners 135 that were recently uninstalled. For example, the panel can determine whether uninstallation of the smart fasteners 135 is authorized based on communication with the monitoring server 160 or the smart tool 140 (or mobile device) of the installer/maintenance person that performed the uninstallation. If the panels 130, 132, or the smart fasteners 135, determine that uninstallation was not authorized person, the panels or system 100 can request that an authorization command or code be input by the installer, for example, within a threshold time period.

The system 100 is configured to trigger an alarm if the code or authorization command is not received within the threshold time period. For example, an alarm or tamper notification can be issued to alert a particular entity/person about a suspected or detected tampering event. During this time, the smart fastener 135 can report its battery life to the panel at the property 102, receive any pending software updates, or obtain new pairing information/logic. Reinstallation of the smart fasteners 135 causes the fasteners to power down again.

When the smart fasteners 135 power down, the system 100 is configured to request confirmation that the smart fasteners 135 have been properly installed (if applicable) and not destroyed or damaged. In some cases, the smart fasteners 135 may not be able to communicate a confirmation report to the monitoring server 160 or panels 130, 132. In these cases, the smart fasteners 135 are configured to store the reporting data, log the attempted transmission of the report, and retry to transmit the report (e.g., back-off fashion).

The smart fasteners 135 can be configured to function as always-on devices that are capable of performing maintenance and reporting status while installed at a security panel. For example, this type of always-on smart fastener 135 can be designed for use in critical applications (e.g., safety critical applications) or when the hardware itself, such as the head 201, is large enough to hold a battery or power source that can be provide the requisite power for extended durations of use. The smart fasteners 135 can be programmed to periodically and infrequently wake up to check for updates and provide status reports to the panels 130, 132 or to the monitoring server 160. For example, the smart fastener 135 can execute these checks or reports once a day, once every few days, or once a week.

In some implementations, the head 201 of the smart fasteners 135 includes a photodiode that can detect and receive light waves. The light waves cause the photodiode to generate an electrical signal that can be used to charge a rechargeable battery or other type of local power source 220 of the smart fasteners 135. In some other implementations, the photodiode is configured as a local power source 220 that can be used in lieu of, or in addition to, battery power such as a rechargeable battery or non-rechargeable battery.

The smart fastener 135 can incorporate BTLE, ultra-wide band ("UWB"), RFID or other technologies to assist maintenance personnel with locating the fastener 135, or to publish instructional materials, maintenance records, or other information back to the maintenance person for viewing on a smart device that communicates with the fastener 135. The LED 240 of the smart fasteners 135 can represent a low-power visual signal that lights only upon command or proximity to a smart tool 140, in order to allow the maintenance user to positively identify the fastener 135 during access.

As noted above, the smart fasteners 135 can be configured to be resistant to tampering. More specifically, smart fasteners 135 can include certain mechanisms that make unauthorized uninstallation (e.g., unscrewing a fastener when armed) very difficult, if not impossible. For example, the smart fasteners 135 can include an example mechanism (e.g., mechanical/electrical solenoids) that causes a head of the smart fasteners 135 to spin freely when the fastener is installed so as to preclude uninstallation. When uninstallation of the smart fasteners 135 is authorized, a command can be provided to cause the head to lock to the shaft. Hence, the head of the smart fastener 135 can be configured to lock to the body (or shaft) only when uninstallation of the smart fastener 135 is authorized. This free-spinning-head configuration can be implemented in various ways.

First, each of the smart fasteners 135 can be configured to such that when a smart fastener 135 is loosened enough to activate its mechanical switch 203 and power on, the fastener 135 could communicate with a security panel 130 or the monitoring server 160 to obtain or exchange status information. If the status information indicates the access to the smart fasteners 135 or the attempted uninstallation is unauthorized, then each of the smart fasteners 135 is configured to disengage a clutch/pawls/etc. that keep the head 201 from rotating on the shaft 202. Hence, in addition to the mechanical switch 203, each of the smart fasteners 135 can include a clutch/pawls, or related mechanisms, which are normally engaged to facilitate tightening/loosening a fastener for authorized installation/uninstallation but that can be also disengaged to prevent loosening and unauthorized uninstallation of the fastener 135.

Second, each fastener can be configured such that when the head 201 of a smart fastener 135 is turned counter-clockwise or depressed down (depending on the design), the head rotates freely, but temporarily closes a small switch (e.g., an internal switch) that activates the smart fastener 135. In response to activating the smart fastener 135, the fastener is configured to connect to the security panel 130, 132 or monitoring server 160, for example, to obtain an authorization command 170 that indicates uninstallation is authorized. Once the smart fastener 135 establishes the connection and receives the authorization command, the smart fastener 135 is configured to engage the head 201 to the shaft/body 202. If the smart fasteners 135 do not establish the connection and/or receive the command 170, the head 201 is configured to remain free-spinning, thus precluding loosening of the fastener and uninstallation.

With respect to the free-spinning-head, each of the first and second configurations described above can also be used in an initial installation mode to activate and register the smart fastener 135. For example, in combination with the installation/pairing mode of the smart fasteners 135, the spinning-head configuration can provide an alternative design option that does not require an additional normally-closed mechanical switch at an exterior wall of the head that faces the body/shaft. Hence, the spinning-head configuration could eliminate the need for this other, additional switch that determines if the smart fastener 135 is fully installed.

The smart fasteners 135 can be also used without the spinning head as a way of waking up the fastener prior to uninstallation. This design option can be used to allow a technician to verify that they are interacting with the correct smart fastener 135, or allow the technician to request permission to uninstall a given smart fastener 135, prior to actually unscrewing the fastener. Once awake, the smart fastener 135 is configured to report the status of the switch (e.g., switch 203 or the small-switch) on the head 201 or to report the presence of a tool 140. This allows a technician to quickly probe a group of smart fasteners 135 and verify they are interacting with the correct smart fastener 135 based on display indications output at a display screen of the tool 140 or an example smartphone device.

With respect to the small switch that activates the smart fastener 135, in some implementations, the small switch is essentially internal to the head of the fastener or positioned intermediate the head and the shaft, such as at a section of the shaft that interfaces or mates with the head. In some examples the head is mated to a slip-ring with a bit of play but with a spring that is configured to keep the small switch in a normally-open switch position. Similarly, each of the smart fasteners 135 can include a set of contacts in the head of the smart fastener 135 that are configured to be closed when a conductive tool makes contact with (e.g., is inserted into or positioned on top of) the head, thus closing the circuit associated with the normally-open, small switch.

In some implementations, contacts in the head of the smart fasteners 135 can be used to recharge a power source installed in the fastener, or provide a transfer power signals (e.g., voltage and/or current) from the conductive tool. The conductive tool is operable to wirelessly power the smart fasteners 135 when the tool is within a threshold distance of the fasteners. For example, as the tool is caused to approach the smart fasteners 135, the tool is operable to wirelessly power or activate the smart fasteners 135, and thus prompt a wake-up and check-in mode of the fastener, corresponding to the exchange of status information as described above.

Figure 3:
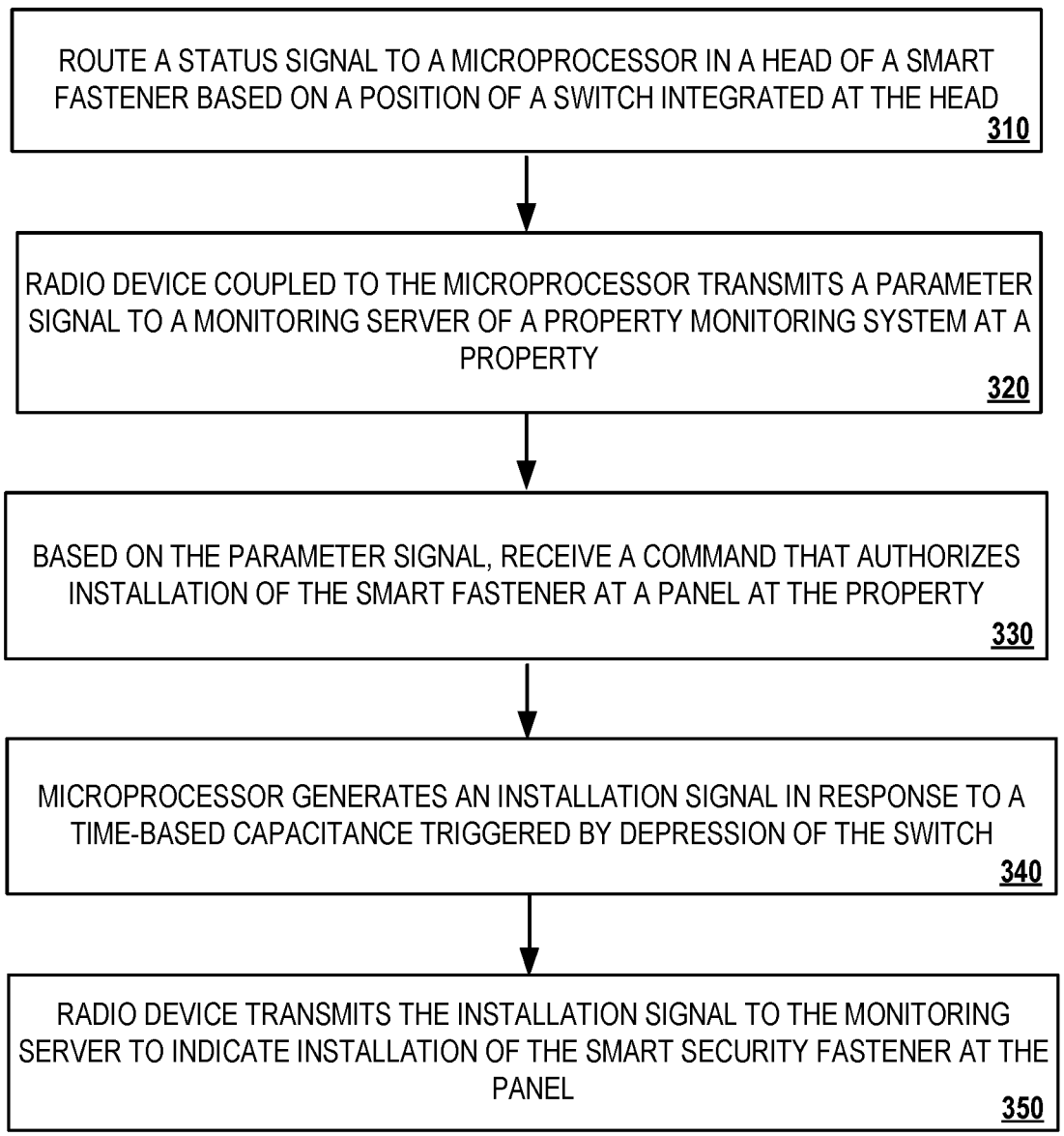
FIG. 3 shows an example process that involves communication between smart fasteners at a property and a monitoring server of a property monitoring system.

FIG. 3 shows an example process 300 that involves communication between smart fasteners at a property and a monitoring server of a property monitoring system. Process 300 can be implemented or executed using the system 100 described above. Descriptions of process 300 may reference the above-mentioned computing resources of system 100. Steps or actions of process 300 can be performed based on programmed firmware or software instructions, which are executable by one or more processors of the devices and resources described in this document.

Referring now to process 300, a status signal is routed to a microprocessor located in a head of a smart fastener (310). For example, a status signal is routed to a microprocessor that is located in head 201, such as 201-1 or head 201-2, of an example smart fastener 135. In some implementations, the status signal is associated with an example wake-up mode (e.g., pairing mode) of a smart fastener 135 that causes the smart fastener to send a portion of encrypted code to a receiving device, such as a panel or the monitoring server 160.

The status signal is routed to the microprocessor based on a position of a switch 203 integrated at the head of the smart fastener. The switch may be a mechanical switch that is configured as a normally-closed mechanical switch. The microprocessor may correspond to, or be represented by, the microcontroller and logic module 205. In some examples, the microprocessor can be processor device that is integrated in the microcontroller and logic module 205.

A radio device that is coupled to the microprocessor transmits a parameter signal to a monitoring server of a property monitoring system at a property (320). For example, the radio device 210 that is coupled to the microprocessor of module 205 is operable to transmit a parameter signal to monitoring server 160 of the system 100. The radio device 210 transmits the parameter signal to indicate a mode of the smart fastener 135. The parameter signal may correspond to the portion of encrypted code described above. The parameter signal can indicate an example fastener identification number of the smart fastener 135. In some implementations, the parameter signal represents a periodic heartbeat of the smart fastener 135 that is transmitted periodically on a predefined frequency.

A command is received that authorizes installation of the smart fastener at a panel at a property (330). The command may be generated by the monitoring server 160 based on the parameter signal and received at one or more smart fasteners 135 using the respective radio device 210 in the smart fasteners 135. The command may also be received by the panel 130, 132 based on the parameter signal. For example, the command 170 or command 175 may be generated by the monitoring server 160 based on a parameter signal that indicates the smart fasteners 135 have successfully paired with an item at the property 102. The item may be the smart tool 140, a security panel, or both.

One or more of the smart fasteners 135 generate an installation signal (340). For example, each of the smart fasteners 135 can generate a respective installation signal using its microprocessor of the microcontroller and logic module 205. The smart fasteners 135 generate the installation signal in response to a time-based capacitance that is triggered after depression of the switch 203 when the smart fastener 135 is installed at the security panel 130, 132.

One or more of the smart fasteners 135 transmit the installation signal that is generated using the microprocessor (350). For example, each of the smart fasteners 135 has a respective radio device 210 that includes a transceiver 215 for transmitting and receiving signal communications. The radio device uses the transceiver 215 to transmit the installation signal to the monitoring server 160 to indicate successful installation of the smart fastener 135 at the panel 130, 132.

FIG. 4 shows an example process 400 that involves communication between a smart fastener at a panel and a tool that interacts with the smart fastener. Much like process 300, process 400 can be implemented or executed using the system 100 described above. Descriptions of process 400 may reference the above-mentioned computing resources of system 100. Steps or actions of process 400 can be performed based on programmed firmware or software instructions, which are executable by one or more processors of the devices and resources described in this document.

Referring now to process 400, a connection mode of a smart fastener is initiated (410). For example, each of the smart fasteners 135 can initiate a connection mode based on a normally-closed switch integrated at the smart fasteners 135. A first connection between the smart fasteners and an item at a property is established based on the connection mode (420). For example, each of the smart fasteners 135 is configured to establish a first connection with a local item at the property 102 based on a pairing (or connection) mode of the smart fastener 135. In some implementations, the item at the property is the security panel 130, 132, whereas in some implementations the item at the property is a smart tool 140 for installing different types of smart fasteners 135 at an example security panel or sensor 120. In at least one example, the item at the property 102 can be the security panel 130, 132 and a second connection is established between the security panel 130 and the smart tool 140, where the smart tool 140 is operable to install or uninstall the smart fastener 135 at the security panel based on a command received at the smart tool 140 from the security panel.

An authorization command is provided in response to establishing the first connection (430). Each of the security panel 130, 132 and the monitoring server 160 can be used to provide an authorization command in response to establishing the first connection. For example, the first connection may be between the smart fasteners 135 and the security panel 130. The security panel 130 is operable to provide an authorization command to the smart fasteners 135 that indicates authorization to install or uninstall the smart fasteners 135 at the security panel 130. The authorization command may also indicate authorization to use a particular smart tool 140 to install or uninstall the smart fasteners 135 at the panel. In some examples, the authorization command may be used to trigger or disable an alarm at the property 102 in association with detected tampering or unauthorized removal of the smart fasteners 135 from a security panel.

In some implementations, the security panels 130, 132 receive a portion of code or data from the smart fasteners 135, generates an authorization command 175 based on the code, and then provides the generated authorization command to the smart fasteners 135 or the smart tool 140. The code/data may be a relatively small (e.g., a few bytes) encrypted data payload, such as an encrypted instruction, that includes a fastener identification number ("fastener ID") and intended application for the fastener. The fastener ID and/or the intended application for the smart fasteners 135 may be cross-referenced against information about the security panels to determine whether installation of the smart fasteners 135 at the panel should be authorized.

The monitoring server 160 can provide distinct authorization commands 170 to each of the smart fasteners 135, the panels 130, 132, or the smart tool 140. For example, each of the security panels 130, 132 or the smart tool 140 can be used to provide an authorization command in response to establishing the first connection with the smart fasteners 135. In some implementations, each of the security panels 130, 132 or smart tool 140 is operable to pass a command 175 generated by the monitoring server 160 as an authorization command that authorizes installation of the smart fasteners 135. The smart fasteners 135 may also communicate directly with the monitoring server 160 to receive commands, such as authorization commands that authorize installation or uninstallation as well as commands to trigger software/firmware updates for the instruction sets processed by the microcontroller and logic module 205.

Using the item at the property, the smart fasteners 135 are installed or uninstalled at the security panel based on the authorization command (440). As noted above, the item may be the smart tool 140, the security panels 130, 132, or both. For example, the smart tool 140 may be a power tool that couples to, or mates with, a head 201 of a smart fastener 135 to guide the smart fastener 135 into or through the security panel. In some examples, the security panels 130, 132 are secured to an item or area of the property using a thread insert, such that the threads of the 250 of a smart fastener 135 contact the threads of the insert to secure the body 202 of the smart fastener 135 in the threaded insert.

Figure 5:
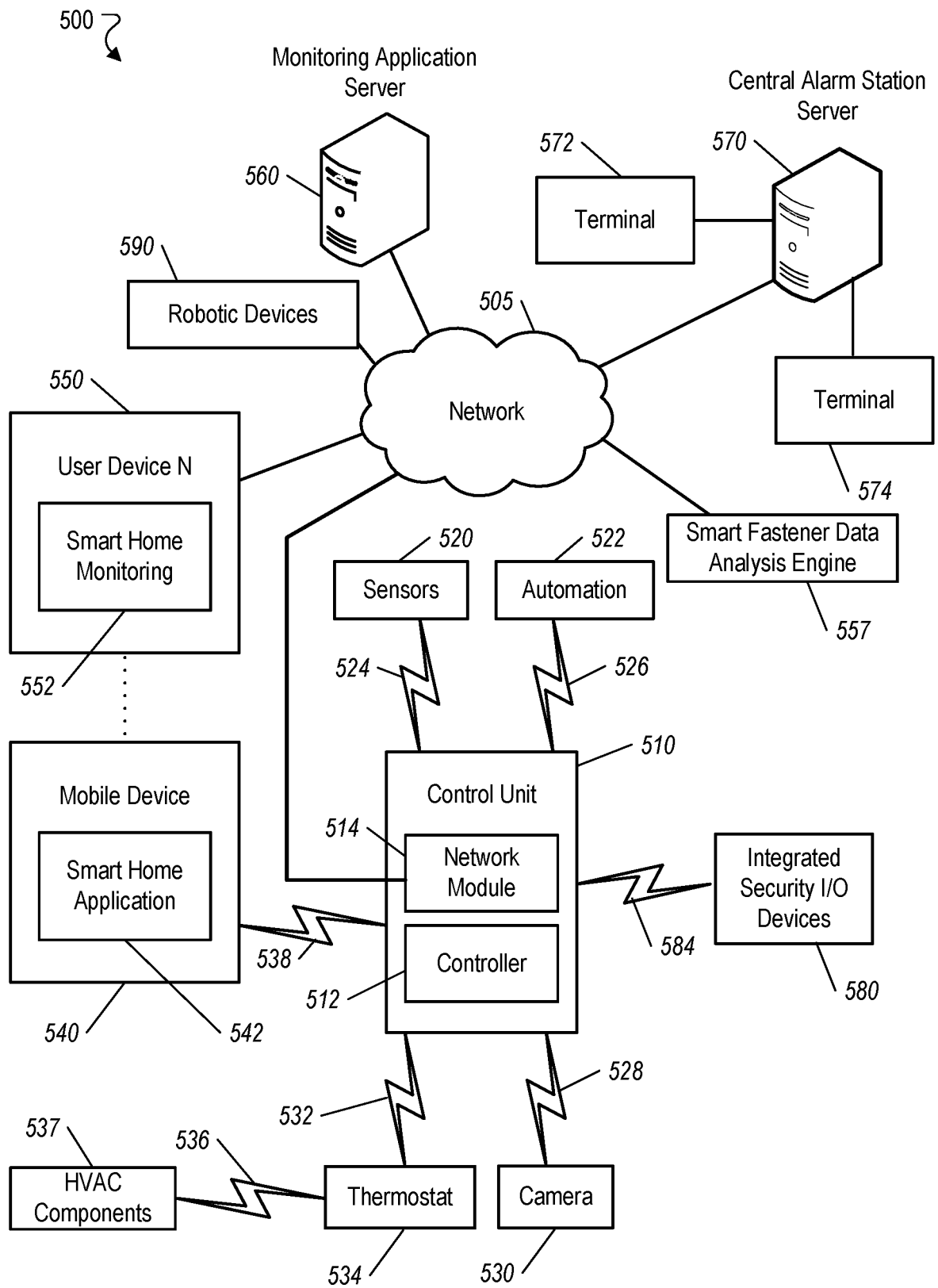
FIG. 5 shows a diagram illustrating an example property monitoring system.

FIG. 5 is a diagram illustrating an example of a property monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information 556 and the state of the HVAC system components to the thermostat 534 and can control the one or more components of the HVAC system based on commands received from the thermostat 534.

The system 500 includes one or more smart fastener data analysis engines 557. Each of the one or more smart fastener data analysis engines 557 connects to control unit 510, e.g., through network 505. The smart fastener data analysis engines 557 can be computing devices (e.g., a computer, microcontroller, FPGA, ASIC, or other device capable of electronic computation) capable of receiving data related to the sensors 520 and communicating electronically with the monitoring system control unit 510 and monitoring server 560.

The smart fastener data analysis engine 557 receives data from the smart fastener 135 and one or more sensors 520. In some examples, the smart fastener data analysis engine 557 can be used to determine or indicate whether a panel at the property is secured based on data generated by the smart fastener 135, including data from sensors 520 (e.g., data from sensor 520 describing motion, movement, temperatures and other parameters). The smart fastener data analysis engine 557 can receive data from the smart fastener 135 and the one or more sensors 520 through any combination of wired and/or wireless data links. For example, the smart fastener data analysis engine 557 can receive sensor data via a Bluetooth, Bluetooth LE, Z-wave, or Zigbee data link.

The smart fastener data analysis engine 557 communicates electronically with the control unit 510. For example, the smart fastener data analysis engine 557 can send data related to the smart fasteners 135 and the sensors 520 to the control unit 510 and receive commands related to determining a state or installation status of smart fasteners 135 based on data from the sensors 520. In some examples, the smart fastener data analysis engine 557 processes or generates sensor signal data, for signals emitted by the sensors 520, prior to sending it to the control unit 510. The sensor signal data can include information that indicates a pre-install mode of the smart fastener 135, installation status of the smart fastener 135, or uninstallation status of the smart fastener 135.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, 536, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, the robotic devices 590, and the smart fastener data analysis engine 557. The one or more user devices 540 and 550 receive data directly from the smart fasteners 135, sensors 520, the home automation controls 522, the camera 530, the robotic devices 590, and the smart fastener data analysis engine 557 and sends data directly to the smart fasteners 135, sensors 520, the home automation controls 522, the camera 530, the robotic devices 590, and the smart fastener data analysis engine 557. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, the robotic devices 590, and the smart fastener data analysis engine 557 are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, the robotic devices 590, and the smart fastener data analysis engine 557 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, the robotic devices 590, and the smart fastener data analysis engine 557 to a pathway over network 505 when the one or more user devices 540 and 550 are farther from the sensors 520, the home automation controls 522, the camera 530, the thermostat 534, the robotic devices 590, and the safety engine.

In some examples, the system leverages GPS information from the one or more user devices 540 and 550 to determine whether the one or more user devices 540 and 550 are close enough to the sensors 520, the home automation controls 522, the camera 530, the thermostat 534, the robotic devices 590, and the smart fastener data analysis engine 557 to use the direct local pathway or whether the one or more user devices 540 and 550 are far enough from the sensors 520, the home automation controls 522, the camera 530, the thermostat 534, the robotic devices 590, and the smart fastener data analysis engine 557 that the pathway over network 505 is required.

In other examples, the system leverages status communications (e.g., pinging) between the one or more user devices 540 and 550 and the sensors 520, the home automation controls 522, the camera 530, the thermostat 534, the robotic devices 590, and the smart fastener data analysis engine 557 to determine whether communication using the direct local pathway is possible. If communication using the direct local pathway is possible, the one or more user devices 540 and 550 communicate with the sensors 520, the home automation controls 522, the camera 530, the thermostat 534, the robotic devices 590, and the smart fastener data analysis engine 557 using the direct local pathway. If communication using the direct local pathway is not possible, the one or more user devices 540 and 550 communicate with the sensors 520, the home automation controls 522, the camera 530, the thermostat 534, the robotic devices 590, and the smart fastener data analysis engine 557 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method implemented using a smart fastener comprising a head and a switch, the method comprising:

initiating a connection mode of the smart fastener based on the switch being in a closed position;
based on the connection mode, establishing a first connection between the smart fastener and an item;
transmitting, by a radio device in the head of the smart fastener, a parameter signal to a monitoring server indicating a mode of the smart fastener;
generating, using a micro-processor of the smart fastener, an installation signal after depression of the switch when the smart fastener is installed;
transmitting, by the radio device, the installation signal to the monitoring server to indicate installation of the smart fastener; and
providing an authorization command in response to establishing the first connection, wherein the authorization command indicates authorization to install or uninstall the smart fastener.

2. The method of claim 1, comprising:
determining that the smart fastener has been installed based on the installation signal transmitted to the monitoring server to indicate installation of the smart fastener.

3. The method of claim 2, comprising:
detecting unauthorized uninstallation of the smart fastener in response to the switch transitions from being open to being closed during uninstallation of the smart fastener; and
transmitting a status signal to the monitoring server based on the detected unauthorized uninstallation of the smart fastener, wherein the status signal indicates an installation status of the smart fastener.

4. The method of claim 2, wherein the item is a smart tool operable to install the smart fastener and a plurality of different types of smart fasteners.

5. The method of claim 2, wherein the item is at least one of:
a security panel;
a smart tool operable to install the smart fastener;
a security camera; or
a sensor.

6. The method of claim 1, wherein the micro-processor is located in a head of the smart fastener and the method comprises:
generating, by the micro-processor, a status signal based on a position of the switch;
wherein the switch is integrated at the head of the smart fastener and the status signal indicates an installation status of the smart fastener.

7. The method of claim 6, wherein transmitting the parameter signal by the radio device to the monitoring server comprises:
transmitting the parameter signal based on the status signal.

8. The method of claim 7, comprising:
receiving, using the radio device, a command that authorizes installation of the smart fastener at a property that is monitored using the monitoring server.

9. The method of claim 8, wherein receiving the command using the radio device comprises:
receiving the command based on the parameter signal.

10. The method of claim 1, wherein:
the switch is a normally-closed switch; and
the switch is integrated in the head of the smart fastener.

11. The method of claim 1, wherein:
the switch is a normally-closed switch integrated along a body of the smart fastener; and
the head is supported by the body and includes circuitry comprising the micro-processor and the radio device.

12. A method comprising:
initiating a connection mode of a smart fastener based on a normally-open switch integrated at the smart fastener;
based on the connection mode, establishing a first connection between the smart fastener and an item at a property;
providing an authorization command in response to establishing the first connection, wherein the authorization command indicates authorization to install or uninstall the smart fastener; and
detecting installation or uninstallation of the smart fastener at the property based on a status signal that is transmitted after the authorization command.

13. The method of claim 12, wherein:
the item at the property is a security panel; or
the item at the property is a smart tool for installing a plurality of different types of smart fasteners.

14. The method of claim 13, wherein the item at the property is the security panel and the method comprises:
establishing a second connection between the security panel and a smart tool for installing a plurality of different types of smart fasteners, wherein the smart tool is operable to install the smart fastener at the security panel.

15. The method of claim 12, wherein providing the authorization command comprises:
providing the authorization command from a monitoring server of a property monitoring system based on a parameter signal transmitted by the smart fastener.

16. The method of claim 13, wherein providing the authorization command comprises:
providing the authorization command from the security panel at the property based on a parameter signal transmitted by the smart fastener.

17. A smart security fastener for installing in a panel, the smart security fastener comprising:
a body configured to be installed in the panel to secure the panel; and
a head supported by the body, wherein the head includes circuitry comprising:
a micro-processor configured to generate control signals after depression of a switch integrated at a wall of the smart security fastener to establish a connection between the smart security fastener and a monitoring system;
a radio device coupled to the micro-processor, wherein the radio device is operable to:
i) transmit, to the monitoring system of the property, data indicating an installation status of the smart security fastener based on the control signals generated by the micro-processor; and
ii) receive a command from the monitoring system that indicates authorization for uninstallation of the smart security fastener from the panel; and
a power source configured to provide power to each of the micro-processor and the radio device.

18. The smart security fastener of claim 17, comprising a switch integrated at an exterior wall of the head that faces the body, wherein the switch is configured to:
protrude from the exterior wall of the head;
be depressed when the smart security fastener is installed at the panel; and
cause the radio device to transmit the data indicating the installation status of the smart security fastener.

19. A smart security fastener for installing in a panel at a property, the smart security fastener comprising:
   a body configured to be installed in the panel to secure the panel; and
   a head supported by the body, wherein the head includes circuitry comprising:
      a micro-processor configured to generate control signals after depression of a switch integrated at an exterior wall of the head or the body, to establish a connection between the smart security fastener and a monitoring system of the property;
      a radio device in the head of the smart security fastener and coupled to the micro-processor, wherein the radio device is operable to:
         i) transmit, to the monitoring system of the property, data indicating an installation status of the smart security fastener based on the control signals generated by the micro-processor; and
         ii) receive a command from the monitoring system that indicates authorization for uninstallation of the smart security fastener from the panel at the property; and
   a power source configured to provide power to each of the micro-processor and the radio device to enable the smart security fastener to establish a connection with the monitoring system.

* * * * *

UNITED STATES PATENT AND TRADEMARK OFFICE
CERTIFICATE OF CORRECTION

| | |
|---|---|
| PATENT NO. | : 11,922,784 B2 |
| APPLICATION NO. | : 17/316107 |
| DATED | : March 5, 2024 |
| INVENTOR(S) | : Donald Gerard Madden and Ethan Shayne |

It is certified that error appears in the above-identified patent and that said Letters Patent is hereby corrected as shown below:

In the Claims

In Claim 17, Column 28, Line 51, delete "system of the property," and insert -- system, --.

Signed and Sealed this
Twenty-third Day of April, 2024

*Katherine Kelly Vidal*

Katherine Kelly Vidal
*Director of the United States Patent and Trademark Office*